(12) United States Patent
Keating et al.

(10) Patent No.: US 12,542,639 B2
(45) Date of Patent: Feb. 3, 2026

(54) COORDINATED POSITIONING VIA SIDELINK RESOURCE

(71) Applicant: Nokia Technologies Oy, Espoo (FI)

(72) Inventors: Ryan Keating, Chicago, IL (US); Tao Tao, Shanghai (CN); Yong Liu, Shanghai (CN); Jun Tan, Glenview, IL (US)

(73) Assignee: Nokia Technologies Oy, Espoo (FI)

( * ) Notice: Subject to any disclaimer, the term of this patent is extended or adjusted under 35 U.S.C. 154(b) by 322 days.

(21) Appl. No.: 18/256,832

(22) PCT Filed: Dec. 11, 2020

(86) PCT No.: PCT/CN2020/135841
§ 371 (c)(1),
(2) Date: Jun. 9, 2023

(87) PCT Pub. No.: WO2022/120817
PCT Pub. Date: Jun. 16, 2022

(65) Prior Publication Data
US 2024/0022375 A1 Jan. 18, 2024

(51) Int. Cl.
*H04L 5/00* (2006.01)
*G01S 13/87* (2006.01)
(52) U.S. Cl.
CPC .......... *H04L 5/0051* (2013.01); *G01S 13/876* (2013.01)
(58) Field of Classification Search
None
See application file for complete search history.

(56) References Cited

U.S. PATENT DOCUMENTS 9,998,856 B2 6/2018 Edge
2016/0095080 A1 3/2016 Khoryaev et al.
(Continued)

FOREIGN PATENT DOCUMENTS

CN 108141776 A 6/2018
CN 110536234 A 12/2019
(Continued)

OTHER PUBLICATIONS

Extended European Search Report received for corresponding European Patent Application No. 20964753.6, dated Jul. 30, 2024, 7 pages.
(Continued)

*Primary Examiner* — Brandon M Renner
(74) *Attorney, Agent, or Firm* — Barta Jones, PLLC

(57) ABSTRACT

Example embodiments of the present disclosure relate to coordinated positioning via sidelink resource. A first terminal device transmits a first message to a plurality of positioning terminal devices including a second terminal device. The first message indicates sidelink resources for transmitting reference signals from the plurality of positioning terminal devices to the first terminal device. Upon receiving the first message, the second terminal device determines a first sidelink resource for transmitting a first reference signal for positioning the first terminal device from the sidelink resources, and then transmits the first reference signal via the first sidelink resource to the first terminal device. Through this solution, a sidelink-based positioning solution can be implemented. In particular, even in the scenario of being partial coverage or being out of coverage, where at least part of the devices involved in the positioning procedure cannot access the network device, the resource allocation for transmitting RSs can be implemented.

14 Claims, 8 Drawing Sheets

(56) References Cited

U.S. PATENT DOCUMENTS

| | | | |
|---|---|---|---|
| 2016/0095092 | A1 | 3/2016 | Khoryaev et al. |
| 2017/0331670 | A1 | 11/2017 | Parkvall et al. |
| 2020/0022089 | A1* | 1/2020 | Guo .................... H04W 52/242 |
| 2020/0077434 | A1 | 3/2020 | Kim et al. |
| 2020/0252990 | A1 | 8/2020 | Ganesan et al. |
| 2020/0351855 | A1* | 11/2020 | Kung .................... H04L 1/1896 |
| 2021/0219268 | A1* | 7/2021 | Li .................... H04B 17/318 |
| 2021/0377912 | A1* | 12/2021 | El Hamss ............ H04L 1/1819 |
| 2022/0086602 | A1* | 3/2022 | Ashraf .................. H04L 1/0003 |
| 2022/0279310 | A1* | 9/2022 | Xiao .................... H04W 4/023 |
| 2022/0286248 | A1* | 9/2022 | Yoshioka ............. H04L 5/0048 |
| 2022/0295442 | A1* | 9/2022 | Goyal .................... H04W 64/00 |
| 2023/0251342 | A1* | 8/2023 | Zhu .................... G01S 5/0063 |
| | | | 455/456.1 |

FOREIGN PATENT DOCUMENTS

| | | |
|---|---|---|
| CN | 111213393 A | 5/2020 |
| CN | 111295914 A | 6/2020 |
| CN | 111343579 A | 6/2020 |
| WO | 2017/196510 A1 | 11/2017 |
| WO | 2019/027245 A1 | 2/2019 |
| WO | 2020/125310 A1 | 6/2020 |

OTHER PUBLICATIONS

"New WID: NR Positioning Support", 3GPP TSG RAN Meeting #83, RP-190752, Agenda: 9.1.1, Intel Corporation, Mar. 18-21, 2019, 6 pages.

"New SID on NR Positioning Enhancements", 3GPP TSG RAN Meeting #86, RP-193237, Agenda: 9.1.1, Qualcomm Incorporated, Dec. 9-12, 2019, 4 pages.

"C-V2X use cases: methodology, examples, and service level requirements", 5G Automotive Association, White Paper, Version 1.0, Jun. 19, 2019, pp. 1-77.

"Revised SID on Study on scenarios and requirements of in-coverage, partial coverage, and out-of coverage positioning use cases", 3GPP TSG RAN Meeting #89e, RP-201518, Agenda: 9.7.12, LG Electronics, Sep. 14-18, 2020, 4 pages.

"Msc-generator", Sourceforge, Retrieved on Jul. 4, 2023, Webpage available at : https://sourceforge.net/projects/msc-generator/.

"3rd Generation Partnership Project; Technical Specification Group Radio Access Network; NR; Physical channels and modulation (Release 16)", 3GPP TS 38.211, V16.3.0, Sep. 2020, pp. 1-133.

"3rd Generation Partnership Project; Technical Specification Group Radio Access Network; NR; Physical layer procedures for data (Release 16)", 3GPP TS 38.214, V16.3.0, Sep. 2020, pp. 1-166.

"3rd Generation Partnership Project; Technical Specification Group Radio Access Network; LTE Positioning Protocol (LPP) (Release 16)", 3GPP TS 37.355, V16.2.0, Sep. 2020, pp. 1-296.

Ghosh et al., "5G Evolution: A View on 5G Cellular Technology beyond 3GPP Release 15", IEEE Access, vol. 7, Sep. 6, 2019, pp. 127639-127651.

"IEEE 802.11", Wikipedia, Retrieved on Jul. 4, 2023, Webpage available at : https://en.wikipedia.org/wiki/IEEE_802.11.

International Search Report and Written Opinion received for corresponding Patent Cooperation Treaty Application No. PCT/CN2020/135841, dated Sep. 13, 2021, 9 pages.

Office action received for corresponding Chinese Patent Application No. 202111509177.0, dated May 30, 2023, 8 pages of office action and no page of translation available.

* cited by examiner

COORDINATED POSITIONING VIA SIDELINK RESOURCE

RELATED APPLICATION

This application was originally filed as PCT Application No. PCT/CN2020/135841, filed on Dec. 11, 2020, of which is incorporated herein by reference in its entirety.

FIELD

Embodiments of the present disclosure generally relate to the field of telecommunication and in particular, to methods, devices, apparatuses and computer readable storage medium for coordinated positioning via sidelink resource.

BACKGROUND

Determining the location or position of a device that is accessing a wireless communication network may be useful for many applications including, for example, autonomous driving, emergency calls, personal navigation, asset tracking, locating a friend or family member, etc. A work item was conducted in the third Generation Partnership Project (3GPP) for native positioning support in New Radio (NR) during Release 16. As a result of that work, the following positioning solutions are specified for Release 16 NR positioning, for example, Downlink Time Difference of Arrival (DL-TDOA), Uplink Time Difference of Arrival (UL-TDOA), Downlink Angle of Departure (DL-AoD), Uplink Angle of Arrival (UL-AoA), Enhanced Cell ID (E-CID), and Multi-cell Round Trip Time (Multi-RTT).

Generally speaking, in a wireless positioning system, if a device (such as, a mobile terminal, a vehicle, and the like) wants to obtain its position, the device needs to exchange and measure a plurality of positioning reference signals (PRSs) with multiple positioning devices. As a result, during the positioning procedure, both the device to be positioned and the multiple positioning devices need to be allocated with a suitable resource for a transmission of PRSs. Therefore, the resource allocation for transmission of PRSs is very important in the wireless positioning system.

SUMMARY

In general, example embodiments of the present disclosure provide a solution for coordinated positioning via sidelink resource. Embodiments that do not fall under the scope of the claims, if any, are to be interpreted as examples useful for understanding various embodiments of the disclosure.

In a first aspect, there is provided a first terminal device. The first terminal device comprises at least one processor; and at least one memory including computer program code; where the at least one memory and the computer program code are configured to, with the at least one processor, cause the first terminal device to, transmit, to a plurality of positioning terminal devices including a second terminal device, a first message indicating sidelink resources for transmitting reference signals (RSs) from the plurality of positioning terminal devices to the first terminal device; and receive, from the second terminal device, a first RS via a first sidelink resource determined from the sidelink resources for positioning the first terminal device.

In a second aspect, there is provided a second terminal device. The second terminal device comprises at least one processor; and at least one memory including computer program code; where the at least one memory and the computer program code are configured to, with the at least one processor, cause the second terminal device to receive, from a first terminal device, a first message indicating sidelink resources for transmitting RSs from a plurality of positioning terminal devices including the second terminal device to the first terminal device; determine, from the sidelink resources, a first sidelink resource for transmitting a first RS for positioning the first terminal device; and transmit, to the first terminal device, the first RS via the first sidelink resource.

In a third aspect, there is provided a method. The method comprises transmitting, at a first terminal device and to a plurality of positioning terminal devices including a second terminal device, a first message indicating sidelink resources for transmitting RSs from the plurality of positioning terminal devices to the first terminal device. The method further comprises receiving, from the second terminal device, a first RS via a first sidelink resource determined from the sidelink resources for positioning the first terminal device.

In a fourth aspect, there is provided a method. The method comprises: receiving, at a second terminal device and from a first terminal device, a first message indicating sidelink resources for transmitting RSs from a plurality of positioning terminal devices including the second terminal device to the first terminal device. The method also comprises determining, from the sidelink resources, a first sidelink resource for transmitting a first RS for positioning the first terminal device. The method further comprises transmitting, to the first terminal device, the first RS via the first sidelink resource.

In a fifth aspect, there is provided a first terminal apparatus. The first terminal apparatus comprises means for transmitting, to a plurality of positioning terminal apparatuses including a second terminal apparatus, a first message indicating sidelink resources for transmitting RSs from the plurality of positioning terminal apparatus s to the first terminal apparatus. The first terminal apparatus further comprises means for receiving, from the second terminal apparatus, a first RS via a first sidelink resource determined from the sidelink resources for positioning the first terminal apparatus.

In a sixth aspect, there is provided a first terminal apparatus. The first terminal apparatus comprises means for receiving, from a first terminal apparatus, a first message indicating sidelink resources for transmitting RSs from a plurality of positioning terminal apparatuses including the second terminal apparatus to the first terminal apparatus. The first terminal apparatus further comprises means for determining, from the sidelink resources, a first sidelink resource for transmitting a first RS for positioning the first terminal apparatus. The first terminal apparatus further comprises means for transmitting, to the first terminal apparatus, the first RS via the first sidelink resource.

In a seventh aspect, there is provided a computer readable medium. The computer readable medium comprises program instructions for causing an apparatus to perform at least the method according to the third aspect.

In an eighth aspect, there is provided a computer readable medium. The computer readable medium comprises program instructions for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
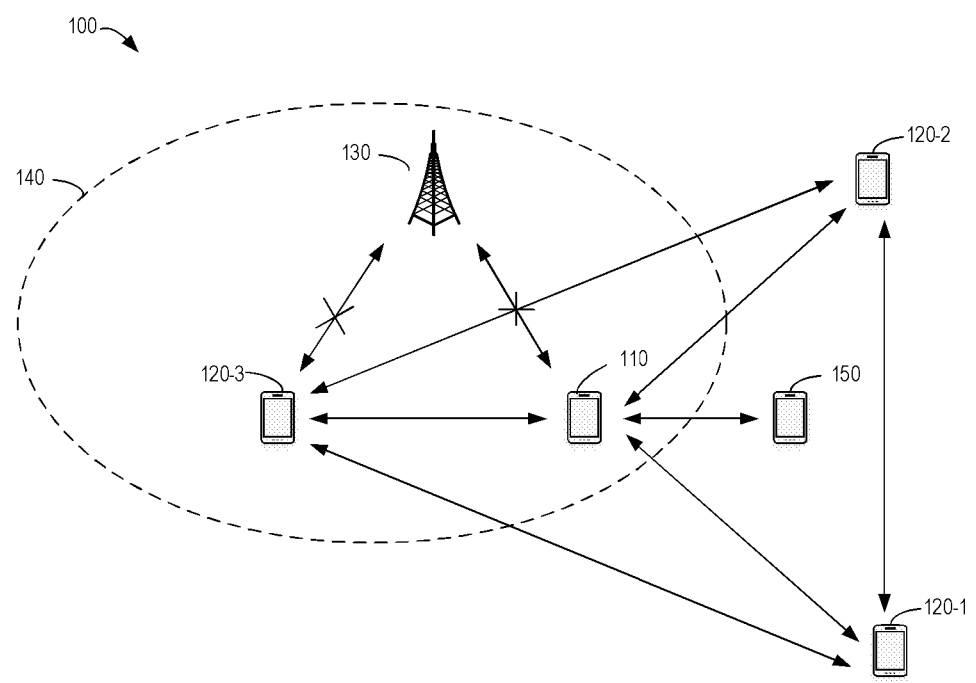
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

As used herein, the term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "positioning terminal device" refers to a terminal device in a communication network which can transmit a RS to the device to be positioned, i.e., has a capability of assisting positioning.

As used herein, the term "resource" or "transmission resource" may refer to any resource for performing a communication, such as a resource in time domain, a resource in frequency domain, a resource in space domain, a resource in code domain, or any other resource enabling a communication, and the like. In the following, a resource in frequency domain or time domain will be used as an example of a transmission resource for describing some example embodiments of the present disclosure. It is to be understood that example embodiments of the present disclosure are equally applicable to other resources in other resource domains.

As used herein, the term "sidelink" refers to a direct communication link and/or discovery link between two or more terminal devices, the term "PC5" refer to an interface which enables communication and/or discovery between two or more terminal devices without traversing any network node and the term "PC5 direct link" refers to the link established between two or more terminal devices over the PC5 interface. The term "sidelink" and "PC5 direct link" described herein are equivalent to each other.

As used herein, the term "RS" may refer to any signal that could be used for estimating the position or location of a device, such as cell-specific reference signal (CRS), sounding reference signal (SRS), demodulation reference signal (DMRS), PRS, or any other RS suitable enabling positioning, and the like. In the following, a PRS will be used as an example of the RS for describing some example embodiments of the present disclosure. It is noted that example embodiments of the present disclosure are equally applicable to other RSs.

Recently, the technology of wireless positioning is growing rapidly and has received a great deal of interest, and multiple positioning solutions have been proposed and stipulated by 3GPP in Release 16. With the rapid development of IoT technology, in Release 17, further work on NR positioning for scenarios related to the industrial IoT will be studied.

In the conventional timing-based positioning techniques (for example, DL-TDOA and multi-RTT), the implementation of positioning solutions rely on receiving the RSs (for example, PRSs) from multiple positioning devices at the same or similar time by the device to be positioned. As for the ranging or RTT techniques, the implementation of positioning solution relies on exchanging and measuring the RSs between the device to be positioned and multiple positioning devices. More specifically, the device to be positioned transmits the RSs to the multiple positioning devices (for example, three positioning devices), and then receives RSs from the multiple positioning devices. In this way, the RTT can be estimated and the position can be derived based at least on the RTT. Therefore, the resource allocation for transmitting RSs is very important in the wireless positioning system.

Conventionally, a network device is usually used as a central control device responsible for the resource allocation in the network. However, although the wireless network has been deployed well, there are still some scenarios that the devices (including the device to be positioned and the positioning devices) cannot access to the network device due to some reason, such as, a terrible wireless communication condition, some unexpected obstacles, and the likes. As a result, in some scenarios, at least part of the positioning devices and the device to be positioned cannot access to the network device, which is referred to as partial coverage or out of coverage. Therefore, in the scenario of partial coverage or out of coverage, the conventional positioning solutions may have issues about resource allocation.

Inventors of the present disclosure notice that the terminal devices in a wireless communication network can communication with each other via direct communications (such as, a sidelink), in addition to communicate with the network device. Therefore, a sidelink-based positioning solution may be implemented, especially for the scenario of being partial coverage or being out of coverage. In view of the above, according to example embodiments of the present disclosure, there is proposed a solution for coordinated positioning via sidelink resource.

In the proposed solution, the terminal device to be positioned (also referred to as a first terminal device) transmits a first message to a plurality of positioning terminal devices. In particular, the first message indicates sidelink resources for transmitting RSs from the plurality of positioning terminal devices to the first terminal device. One of the positioning terminal devices (also referred to as a second terminal device hereafter) may determine a first sidelink resource for transmitting a first reference signal from the second terminal device to the first terminal device from the sidelink resources, and then transmits the first RS to the first terminal device via the determined sidelink resource. In this way, a sidelink-based positioning solution can be implemented. Even in the scenario of partial coverage or out of coverage, where some terminal devices involved in the positioning procedure are not connected to the network device, the resource allocation for RS transmission still can be implemented.

It is to be understood that although the proposed positioning solution benefits especially the scenario of being partial coverage or being out of coverage, it is also suitable to be implemented in the scenario of being coverage.

FIG. 1 shows an example communication network 100 in which some example embodiments of the present disclosure can be implemented. The example communication network 100 includes a network device 130, first terminal device 110, and a neighbor device 150 of the first terminal device 110. The communication network 100 also includes a plurality of positioning terminal devices 120-1 to 120-3 (collectively referred to as positioning terminal devices 120) for assisting positioning the first terminal device 110. For purpose of illustration, in some embodiments of the present disclosure, the positioning terminal devices 120-1 is also referred to as a second terminal device 120-1, the positioning terminal devices 120-2 is also referred to as a third terminal device 120-2 and the positioning terminal devices 120-4 is also referred to as a fourth terminal device 120-3.

In the example of FIG. 1, the network device 130 provides a serving area called as cell 140. The first terminal device 110 and the fourth terminal device 120-3 are within the coverage of the cell 140, but the first terminal device 110 and the fourth terminal device 120-3 cannot access to the network device 130 due to some reasons, such as, being obscured by some obstacles, being in a coverage hole of the cell 140, a terrible wireless communication condition, and the like. The second terminal device 120-1, the third terminal device 120-2 and the neighbor device 150 are out of the coverage of the cell 140, which also means a failure of accessing the network device 130.

As shown in FIG. 1, the first terminal device 110 and the positioning terminal devices 120 can communicate with each other via physical communication channels or links, such as, a sidelink or a PC5 direct link. Further, as a specific example, the first terminal device 110 is a device to be positioned, and the first terminal device 110 may exchange and measure RSs with the positioning terminal devices 120-1 to 120-3 to determine its position.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the number of devices (such as, the first terminal device 110, the positioning terminal devices 120, the network device 130 and the neighbor device 150) and their connections shown in FIG. 1 are only for the purpose of illustration without suggesting any limitation. The communication environment 100 may include any suitable number of devices adapted for implementing embodiments of the present disclosure. Although not shown, it is to be understood that one or more additional first terminal devices and positioning terminal devices may be located within or out of the cell 140, and for each first terminal device 110, one or more additional neighbor devices may be deployed within or out of the cell 140. It is also be understood that in some examples, only the homogeneous network deployment or only the heterogeneous network deployment may be included in the communication environment 100.

Example embodiments of the present disclosure will be described in detail below with reference to the accompanying drawings.

Figure 2:
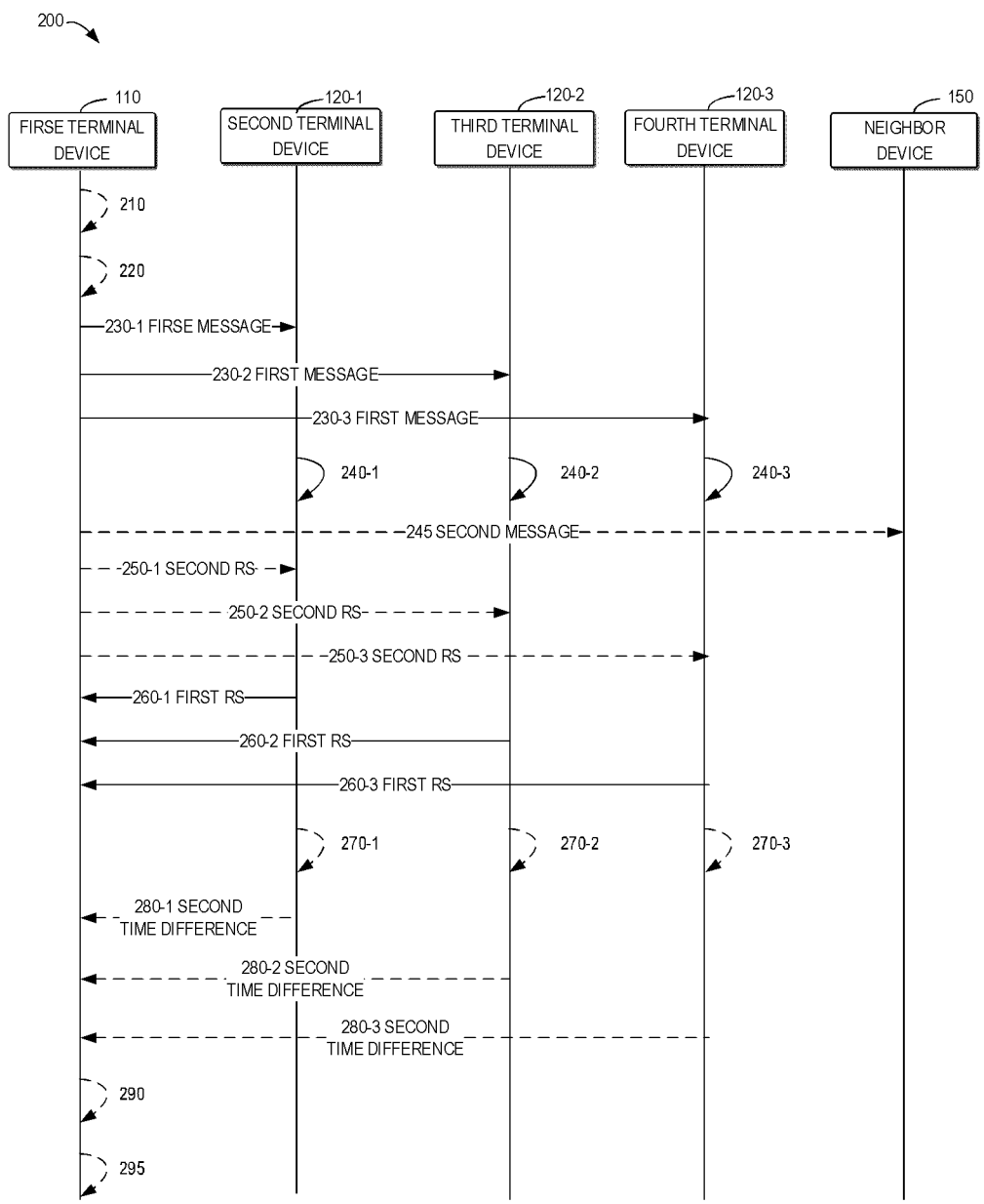
FIG. 2 illustrates a signaling flow for coordinated positioning via sidelink resource according to some example embodiments of the present disclosure.

Reference is now made to FIG. 2, which shows a signaling flow 200 for coordinated positioning via sidelink resource according to some example embodiments of the present disclosure. For the purpose of discussion, the signaling flow 200 will be described with reference to FIG. 1. The signaling flow 200 may involve the first terminal device 110, the positioning terminal devices 120 (including the second terminal device 120-1, the third terminal device 120-2 and the fourth terminal device 120-3) and the neighbor device 150.

Further, it is to be understood that the order of the signalings and actions in FIG. 2 is shown only for the purpose of illustrations. The order of the signalings and actions illustrated in signaling chart 200 may be performed in any suitable order adapted for implementing embodiments of the present disclosure.

In the signaling flow 200, the first terminal device 110 is a device to be positioned, and the neighbor device 150 is located near to the first terminal device 110. The first terminal device 110 may exchange and measure RSs with the second terminal device 120-1, the third terminal device 120-2 and the fourth terminal device 120-3 to determine its position.

Moreover, it is to be understood that the second terminal device 120-1, the third terminal device 120-2 and the fourth terminal device 120-3 are equivalent with each other as being a positioning terminal device. In other words, although the operations of the second terminal device 120-1 will be mainly discussed in the following, the operations described for the second terminal device 120-1 also are suitable for the third terminal device 120-2 and the fourth terminal device 120-3.

In operation, the first terminal device 110 detects 210 a requirement for obtaining its position in response to a positioning trigger. One example of the positioning trigger condition is that the first terminal device 110 reveries a request from a location-based application. Another example of positioning trigger condition is that a timer for a periodicity positioning procedure is expired. It should be understood that the above example positioning trigger conditions are illustrated only for the purpose of illustration without suggesting any limitations. In other example embodiments, the first terminal device 110 may detect the requirement for obtaining its position in response to any suitable positioning trigger conditions.

The first terminal device 110 then determines 220 positioning terminal devices 120 that can function as positioning terminal devices and assist the first terminal device 110 to determine its position. The determination of the positioning terminal devices 120 can be implemented in several ways. For example, the first terminal device 110 may store and maintain a list of devices which had assisted the first terminal device 110 to estimate its position previously, and the first terminal device 110 may select the positioning terminal devices 120 from the list. Alternatively, the first terminal device 110 may determine the positioning terminal devices 120 though current discovery mechanism. In some other example embodiments, the first terminal device 110 may determine the positioning terminal devices 120 in other suitable manners, and the scope of the present disclosure is not limited in this regard.

In the example illustrated in connection with the signaling flow 200, the first terminal device 110 determines 220 the positioning terminal devices 120 including the second terminal device 120-1, the third terminal device 120-2 and the fourth terminal device 120-3. The first terminal device transmits 230-1 a first message to the second terminal device 120-1, also transmits 230-2 the first message to the third terminal device 120-2 and further transmits 230-3 the first message to the fourth terminal device 120-3. In particular, the first message may indicate sidelink resources for transmitting RSs from the plurality of positioning terminal devices (i.e., the second terminal device 120-1, the third terminal device 120-2 and the fourth terminal device 120-3) to the first terminal device 110.

In some example embodiments, the first message may be transmitted to the positioning terminal devices 120 either in a broadcast manner or in a groupcast/multicast manner. Alternatively, first message may be transmitted to the positioning terminal devices 120 in a unicast manner. It is to be understood that the first terminal device 110 may determine a proper manner to transmit the first message, such as, according to the number of the positioning terminal devices 120, and the scope of the present disclosure is not limited in this regard. In this way, the manner for transmitting the first message is more flexible.

In some example embodiments, the first message is transmitted via a physical sidelink shared channel (PSSCH). It is to be understood that in some other example embodiments, the first message may be transmitted via any suitable type of sidelink channel (such as, dedicated channel, data channel, common control channel, and the like) and any type of suitable sidelink message, and the scope of the present disclosure is not limited in this regard.

In this way, compared with the conventional mechanism for resource allocation, where the resource allocation merely relies on the network device (for example, the network device 130 in FIG. 1), the terminal device to be positioned (for example, the first terminal device 110 in FIG. 1) according to embodiments of the present disclosure will function as a central controller responsible for resource allocation.

In some example embodiments, the first message comprises identifications of the determined positioning terminal devices 120, such that, any of the positioning terminal devices 120 may determine respective sidelink resource based on the identifications. For example, there may be a pre-configured mapping between the sidelink resources and the identifications. The first terminal device 110 may determine and allocate the sidelink resources according to the pre-configured mapping.

In some example embodiments, the identifications of the positioning terminal devices 120 may be physical layer identifications. Alternatively, in some other example embodiments, the identifications of the positioning terminal devices 120 also may be higher layer (such as, Medium Access Control Layer, Radio Resource Control layer, transport layer, network layer, application layer, and the like) identifications. Alternatively, in some further other example embodiments, the identifications of the positioning terminal devices 120 also may be hardware identifications or user identifications, and the like. It is to be understood that the identifications may be represented as any suitable form, and the scope of the present disclosure is not limited in this regard.

In this way, the overhead of the first message is minimized, since no additional information is needed in the first message except for the identifications of the positioning terminal devices.

Additionally, in some example embodiments, the first message further may comprise a resource configuration. The resource configuration at least indicates the sidelink resources for transmitting the RSs. In other words, the resource configuration may indicate more resource compared with the sidelink resources actually needed for transmitting the RSs. Each of the positioning terminal devices 120 may determine the respective sidelink resource based on the identifications and the resource configuration.

The sidelink resources indicated by the resource configuration may be represented in any suitable manner. One example manner is a comb resource, which may be represented by parameters of the size of the comb resource, the type of the comb resource, and the like. Another example manner is a resource list, which illustrates all the sidelink resources. It is to be understood that in the other example embodiments, the sidelink resources indicated by the resource configuration may be represented as any suitable form, and the scope of the present disclosure is not limited in this regard.

Further, the sidelink resource discussed herein may be resource of any type. In some example embodiments, the sidelink resource is time resource. In the example of time resource, the resource configuration may comprise a set of time resources, such as, a set of continuous or non-continuous subframes, OFDM symbols, physical resource blocks, and the like.

Alternatively, or in addition, in some example embodiments, the sidelink resource is frequency resource. In the example of frequency resource, the resource configuration may comprise a set of frequency resources, such as, a set of continuous or non-continuous sub-carriers, sub-bands, physical resource blocks, and the like.

Alternatively, or in addition, in some example embodiments, the sidelink resource is code resource. In the example of code resource, the resource configuration may comprise a set of code resources, such as, a set of orthogonal codewords, indexes of precoding matrixes, and the like.

Alternatively, or in addition, in some example embodiments, the sidelink resource is space resource. In the example of space resource, the resource configuration may comprise a set of space resources, such as, a set of antenna ports, or antenna beams, and the like.

It is to be understood that the sidelink resources discussed herein may be of any suitable type, and may also be a combination of different types of resource, and the scope of the present disclosure is not limited in this regard. In this way, by comprising the resource configuration at least indicating the sidelink resources in the first message, the sidelink resource allocation made by the first terminal device 110 may be more reasonable.

In some example embodiments, the resource configuration comprises a set of resource offsets, where each resource offset indicates an offset from a second sidelink resource to one of the sidelink resources for transmitting RSs. The second sidelink resource used for transmitting a second reference signal from the first terminal device 110 to the plurality of positioning terminal devices 120. In some example embodiments, the resource configuration comprises a set of timing offsets, which indicates the time offset between a time point of receiving the second RS at the positioning terminal devices 120 and the time points of transmitting the RSs to the first terminal device 110 by the positioning terminal devices 120, respectively. In some other example embodiments, the resource configuration comprises a set of frequency offsets, which indicates the frequent offset between a carrier used by the second RS and the carriers used for transmitting the RSs from the positioning terminal devices 120 to the first terminal device 110, respectively. In some further example embodiments, the resource configuration comprises a set of code offsets, which indicates the code offset between a code used by the second RS and the codes used by the RSs transmitted from the positioning terminal devices 120 to the first terminal device 110, respectively.

It is to be understood that similar with the sidelink resource discussed above, the resource offsets discussed herein also may be of any suitable type, and may also be a combination of different types of resource, and the scope of the present disclosure is not limited in this regard.

In this way, a more reasonable resource allocation is achieved without introducing undue overhead.

Alternatively, in some example embodiments, the first terminal device 110 transmits 245 a second message to at least one of its neighbor device(s) 150. In particular, the second message indicates the sidelink resource that is allocated to be used for exchanging the RSs and additional measurement results of the RSs among the first terminal device 110 and the positioning terminal devices 120. More specifically, the second message indicates the second sidelink resource used for transmitting second RS from the first terminal device 110 to the positioning terminal devices 120, and the sidelink resources used for transmitting RSs from the positioning terminal devices 120 to the first terminal device 110.

In some example embodiments, the second message is transmitted via sidelink control information (SCI) on a physical sidelink control channel (PSCCH). It is to be understood that in some other example embodiments, the second message may be transmitted via any suitable type of sidelink channel (such as, dedicated channel, data channel, common control channel, and the like) and any type of suitable sidelink message, and the scope of the present disclosure is not limited in this regard.

In this way, the resources for transmitting the RSs for positioning the first device 110 are reserved and a conflict of resource usage is avoided.

Upon receiving the first message from the first terminal device 110, the second terminal device 120-1 may determine 240-1 the first sidelink resource for transmitting a first RS from the second terminal device 120-1 to the first terminal device 110. Similar with the second terminal device 120-1, the third terminal device 120-2 may determine 240-2 a fourth sidelink resource for transmitting a further first RS from the third terminal device 120-2 to the first terminal device 110, and the fourth terminal device 120-3 may determine 240-3 a fifth first sidelink resource for transmitting another first RS from the fourth terminal device 120-3 to the first terminal device 110.

More specifically, in case that the first message comprises identifications of the positioning terminal devices 120, the second terminal device 120-1 may determine the first sidelink resource based on the set of identifications, for example, according to a pre-configured or pre-determined mapping between the sidelink resources and the identifications.

Additionally, in some example embodiments, in case that the first message further comprises a resource configuration at least indicating sidelink resources for transmitting the RSs, the second terminal device 120-1 may determine the first sidelink resource for transmitting the first RS based on the set of identifications and the resource configuration. For example, the second terminal device 120-1 determines the first sidelink resource from the sidelink resources according to ascending or descending sequence of identifications.

Additionally, in some example embodiments, in case that the resource configuration comprises a set of resource offsets, where each resource offset indicates an offset from the second sidelink resource to one of the sidelink resources. As illustrated in FIG. 2, the first terminal device 110 transmits 250-1 a second RS to the second terminal device 120-1 via the second sidelink resource, also transmits 250-2 the second RS to the third terminal device 120-2 and further transmits 250-3 the second RS to the fourth terminal device 120-3.

In some example embodiments, the second RS transmitted to the positioning devices 120 is a sequence with a pre-defined or pre-configured value which is known to the first terminal device and the positioning devices 120 previously. That is, the second terminal device 120-1, the third terminal device 120-2 and the fourth terminal device 120-3 receive the same second RS. In this way, the positioning terminal devices 120 may obtain respective second RS by blind detection.

Upon receiving the second RS from the first terminal device 110, the second terminal device 120-1 may determine the second sidelink resource corresponding to the received second RS first. For example, determine a reception of the second RS at the second terminal device 120-1, a carrier used by the second RS, a code used by the second RS, and so on. Then the second terminal device 120-2 determines the first sidelink resource based on the determined second sidelink resource and the set of resource offsets comprised in the first message.

Figure 4:
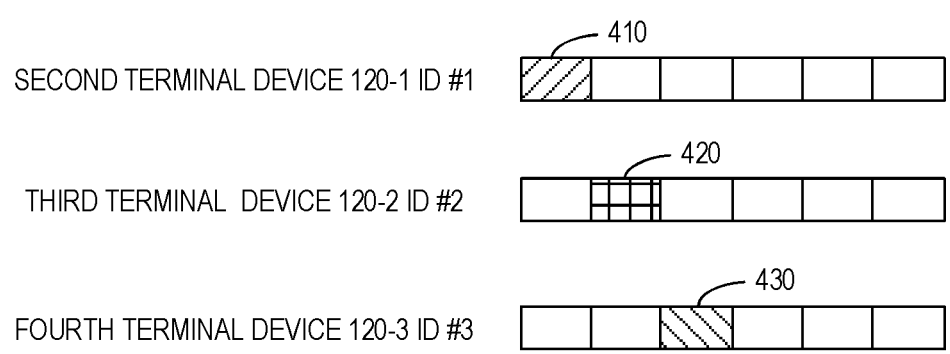
FIG. 4 illustrates an example block diagram of a resource allocation according to some example embodiments of the present disclosure.

Reference is now made to FIG. 4, which shows an example block diagram 400 of a resource allocation according to some example embodiments of the present disclosure. As illustrated in FIG. 4, a comb timing offsets is indicated in the first message. Further, the identifications for the second terminal device 120-1, the third terminal device 120-2 and the fourth terminal device 120-3 are with the values of #1, #2 and #3, respectively. The first terminal device 110 transmits the first message comprising the identifications of the second terminal device 120-1, the third terminal device 120-2 and the fourth terminal device 120-3 and a resource configuration indicating the comb timing offsets (such as, the size of the comb timing offsets). In case that the positioning terminal devices 120 determine the respective sidelink resources according to ascending sequence of identifications, upon receiving the first message from the first terminal device 110, the second terminal device 120-1 determines its first sidelink resource corresponding to the first timing offset 410, the third terminal device 120-2 determines the fourth sidelink resource corresponding to the second timing offset 420, and fourth terminal device 120-3 determines a fifth sidelink resource corresponding to the third timing offset 430.

It is to be understood that the example block diagram 400 of a resource allocation is only for the purpose of illustration without suggesting any limitation. In other example embodiments, the sidelink resource may be of any suitable type or a combination of different types of sidelink resource. For example, the sidelink resource indicated by the first message may also be a comb frequency offset, a comb code offset, a comb of space offset, and the like, and the scope of the present disclosure is not limited in this regard. Further, the first message may merely comprise the set of identifications, or indicates the sidelink resources by using any suitable manner. Moreover, the second terminal device 120-1, the third terminal device 120-2 and the fourth terminal device 120-3 may determine the first sidelink resource, fourth sidelink resource and fifth sidelink resource according to any suitable pre-configured mapping, and the scope of the present disclosure is not limited in this regard.

It is to be understood that the above discussion about the determination for the first sidelink resource with respect to the second terminal device 120-1 also suitable for the determination for the fourth sidelink resource with respect to the third terminal device 120-2 and the determination for the fifth sidelink resource with respect to the fourth terminal device 120-2.

In this way, the devices which are selected to assist positioning are allocated with respective sidelink resources, even the devices are out of the coverage of the network device.

After the discussion about the determination of sidelink resource, reference is now made back to FIG. 2.

The second terminal device 120-1 may transmit 260-1 a first RS to the first terminal device 110 via the determined first sidelink resource. Similar with the second terminal device 120-1, the third terminal device 120-2 may transmit 260-2 a further first RS to the first terminal device 110 via the fourth sidelink resource, and the fourth terminal device 120-3 may transmit 260-3 another first RS to the first terminal device 110 via the fifth sidelink resource.

The first terminal device 110 obtains 290 a set of first time differences, where first time difference indicates a difference between a first time point of a reception of the first RS at the first terminal device 110 and a second time point of transmission of the second RS at the first terminal device 110. More specifically, the first terminal device 110 determines the first time point in response to receiving the first reference signal from the second terminal device 120-1, determines the second time point in response to transmitting the second reference signal at the first device 110, and obtains the first time difference based on the first time point and the second time point.

Further, the first terminal device 110 determines a further first time point in response to receiving a further first reference signal from the third terminal device 120-2, determines a further second time point in response to transmitting a further second reference signal to third terminal device 120-2, and obtains a further first time difference based on the further first time point and the further second time point.

In addition, the first terminal device 110 also obtains another first time deference. More specifically, the first terminal device 110 determines another first time point in response to receiving another first reference signal from the fourth terminal device 120-3, determines another second time point in response to transmitting another second reference signal to fourth terminal device 120-3, and obtains another first time difference based on the another first time point and the another second time point. Therefore, the first terminal device 110 may obtain a set of first time differences (including the first time difference, the further first time difference and the first time difference).

In some example embodiments, the second RS transmitted to the positioning terminal device 120 are transmitted in a broadcast manner or in a groupcast/multicast manner.

Further, in order to estimate the position more accurately, a bidirectional measurement for time differences is necessary, which means that the positioning terminal devices 120 also need to transmit respective second time differences to the first terminal device 110. The second time difference indicates a difference between a third time point of a transmission of the first RS at the second terminal device 120-1 and a fourth time point of reception of the second RS at the second terminal device 120-1. As illustrated in FIG. 2, the second terminal device 120-1 obtains 270-1 the second time difference and then transmits 280-1 the obtained second time difference to the first terminal device 110 via a third sidelink resource.

Similar with the second terminal device 120-1, the third terminal device 120-2 obtains 270-2 a further second time difference and transmits 280-2 the obtained further second time difference to the first terminal device 110, and the fourth terminal device 120-3 obtains 270-3 another second time difference and transmits 280-3 the obtained the another second time difference to the first terminal device 110. Therefore, the first terminal device 110 may receive a set of second time differences.

The first terminal device 110 may determine 295 its position based at least on the measured set of first time differences and the received set of second time differences. Additionally, some further parameters (for example, the positions of the positioning terminal devices 120, and so on) are also needed during the procedure of determining the position of the first device 110. It is to be understood that the positions of the positioning terminal devices 120 may be obtained in any suitable manner, for example, global positioning system (GPS) device, historical information, and the like, and the scope of the present disclosure is not limited in this regard. In this way, the first terminal device 110 may estimate its position more accurately.

In some example embodiments, the positioning terminal devices 120 transmit the second time differences by reusing at least part of the sidelink resources for transmitting the first RSs. For example, as for the second terminal device 120-1, the third sidelink resource and the first sidelink resource are at least partially overlapped. Further, in some example embodiments, as for the second terminal device 120-1, the third sidelink resource and the first sidelink resource discussed above occupy a same sidelink resource.

In this way, there is no need to additionally allocate sidelink resource for the second time differences, and further reduce the overhead of the exchanging signals.

Through this solution, even in the scenario of being partial coverage or being out of coverage, the resource allocation for transmitting RSs can be implemented.

Figure 3:
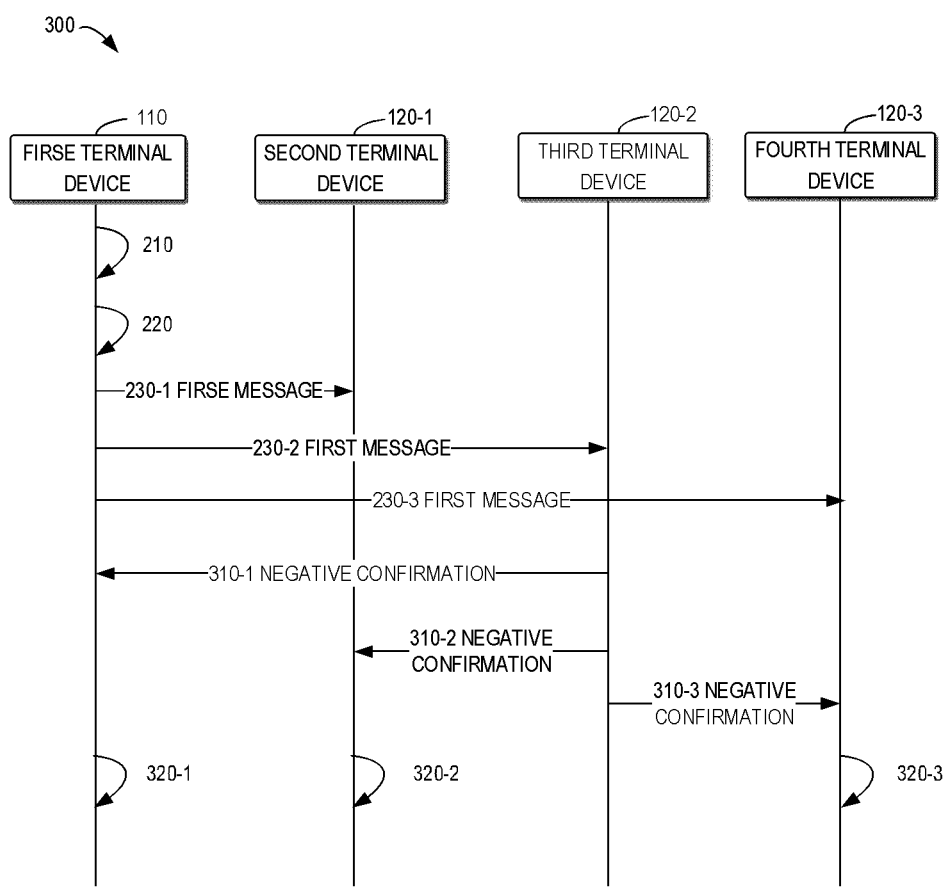
FIG. 3 illustrates a signaling flow for feedback mechanism during the coordinated positioning via sidelink resource according to some example embodiments of the present disclosure.

Besides the above discussion, during the positioning process, the positioning terminal devices 120 may additionally transmit a feedback to the first terminal device 110 upon receiving the first message. Reference is now made to FIG. 3, which shows a signaling flow 300 for feedback mechanism during the coordinated positioning via sidelink resource according to some example embodiments of the present disclosure. For the purpose of discussion, the signaling flow 300 will be described with reference to FIGS. 1 and 2. The signaling flow 300 may involve the first terminal device 110 and the positioning terminal devices 120 (i.e., the second terminal device 120-1, the third terminal device 120-2 and the fourth terminal device 120-3). Further, the order of the signalings and actions in FIG. 2 is shown only for the purpose of illustrations. The order of the signalings and actions illustrated in signaling chart 200 may be performed in any suitable order adapted for implementing embodiments of the present disclosure.

In the signaling flow 300, the first terminal device 110 detects 210 a requirement for obtaining its position in response to a trigger condition, and determines 220 multiple positioning terminal devices 120-1 to 120-3 to function as positioning terminal device. Then the first terminal device 110 transmits 230-1 a first message to the second terminal device 120-1, also transmits 230-2 the first message to the third terminal device 120-2, and further transmits 230-3 the first message to the fourth terminal device 120-3. In addition, the first message may indicate respective first sidelink resources for transmitting first RSs from the plurality of positioning terminal devices 120-1 to 120-3. It is to be understood that the above process is similar with that of process discussed in FIG. 2. For the sake of brevity, the similar content is omitted herein.

Upon receipt of the first message, any of the positioning terminal devices 120 may transmit a feedback to the first terminal device 110. The feedback may be a positive confirmation or a negative confirmation. In some example embodiments, the feedback can be implemented by a combination with a current acknowledgement/negative acknowledgement (ACK/NACK) procedure. For example, the ACK may be used as a positive confirmation and the NACK may be used as a negative confirmation. Alternatively, in other example embodiments, the feedback may be implemented by other current feedback mechanism, for example, a response message comprising information indicates the feedback results.

In the signaling flow 300, the third terminal device 120-2 transmits 310-1 a negative conformation to the first terminal device 110. For example, in some example embodiments, if the third terminal device 120-2 cannot decode the first message successfully, the third terminal device 120-2 may transmit a negative confirmation to the first terminal device 110 via a sidelink. One example of the negative confirmation is NACK. Alternatively, another example of the negative confirmation is a response comprising information indicating a failure of decoding the first message.

In some example embodiments, in case that the third terminal device 120-2 may decode the first message successfully, the third terminal device 120-2 may further determine whether enable to transmit the first RS via the fourth sidelink resource indicated by the first message or not. If the third terminal device 120-2 determines that the third terminal device 120-2 cannot transmit the first RS, the third terminal device 120-2 may transmit a negative confirmation indicating incapability of transmission of the first RS via the fourth sidelink resource.

There are many possible reasons that may result the third terminal device 120-2 cannot transmit the first RS via the fourth sidelink resource. As one example, the third terminal device 120-2 does not have a capability of assisting positioning. Alternatively, the second terminal device 120 finds that the sidelink resource indicated by the first message is not available. It is to be understood that the third terminal device 120-2 may determine that it cannot transmit the first RS via the first sidelink resource indicated by the first message due to any suitable reasons, and the scope of the present disclosure is not limited in this regard.

Upon receipt of the negative conformation for the first message from the third terminal device 120-2, the first terminal device 110 may be aware that the third terminal device 120-2 cannot function as a positioning terminal device.

In some example embodiments, the first terminal device 110 may directly stop the current positioning procedure in response to receiving the negative conformation.

Alternatively, in some example embodiments, the first terminal device 110 determines whether the current positioning procedure can implement successfully without the assisting of the third terminal device 120-2 first. If the first terminal device 110 determines that the current positioning procedure cannot implement successfully without the assisting of the third terminal device 120-2, the first terminal device 110 may stop 320-1 the current positioning procedure, and additionally initiate a reselection procedure of the positioning terminal devices. Else, if the first terminal device 110 determines that the current positioning procedure can implement successfully without the assisting of the third terminal device 120-2, the first terminal device 110 may proceed with the current positioning procedure with other positioning terminal devices.

In some example embodiments, the negative conformation is transmitted in a broadcast manner or in a groupcast/multicast manner. As a result, both the first terminal device 110 and the other positioning terminal devices (i.e., the second terminal device 120-1 and the fourth terminal device 120-3) may receive the negative conformation. As illustrated in FIG. 3, the second terminal device 120-1 and the fourth terminal device 120-3 decode the first message successfully, and then the second terminal device 120-1 and the fourth terminal device 120-3 monitor a feedback channel. The second terminal device 120-1 receives 310-2 the negative conformation from the third terminal device 120-2, and the fourth terminal device 120-3 receives 310-3 the negative conformation from the third terminal device 120-2.

In some example embodiments, in response to receiving the negative conformation, the second terminal device 120-1 may directly stop 320-2 the current positioning procedure and the fourth terminal device 120-3 also may directly stop 320-3 the current positioning procedure. For example, the second terminal device 120-1 and the fourth terminal device 120-3 stop monitoring the second RS from the first terminal device 110, or stop transmitting first RS to the first terminal device 110 via the respective sidelink resources indicated by the first message.

In some example embodiments, the second terminal device 120-1 and the fourth terminal device 120-3 may ignore the negative conformation and continue to assist in positioning of the first terminal device 110.

In this way, by transmitting the negative conformation to the first terminal device 110 and the other selected positioning terminal devices, in case that the current positioning procedure cannot be performed successfully, an unnecessary subsequent interaction may be avoided.

Alternatively, in addition to the negative conformation, a positive conformation also be transmitted to the first terminal device 110 and the other selected positioning terminal devices. In this way, the first terminal device 110 and the other selected positioning terminal devices may obtain the states of the current positioning procedure and the resource allocation in time.

Figure 5:
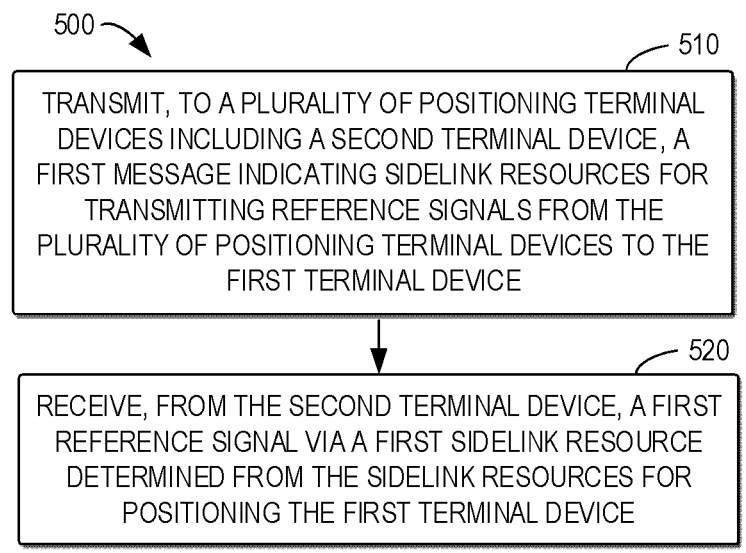
FIG. 5 illustrates a flowchart of a method implemented at a first apparatus according to some example embodiments of the present disclosure.

FIG. 5 shows a flowchart of an example method 500 implemented at the first terminal device 110 in accordance with some example embodiments of the present disclosure. For the purpose of discussion, the method 500 will be described from the perspective of the first terminal device 110 with respect to FIGS. 1 to 3.

At block 510, the first terminal device 110 transmits, to a plurality of positioning terminal devices 120 including a second terminal device 120-1. The first message indicating sidelink resources are used for transmitting RSs from the plurality of positioning terminal devices 120 to the first terminal device 110.

At block 520, the first terminal device 110 receives, from the second terminal device 120-1, a first RS via a first sidelink resource determined from the sidelink resources for positioning the first terminal device 110.

In some example embodiments, the first message comprises identifications of the plurality of positioning terminal devices 120 to enable the second terminal device 120-1 to determine the first sidelink resource based on the identifications.

In some example embodiments, the first message further comprises a resource configuration at least indicating the sidelink resources, to enable the second terminal device 120-1 to determine the first sidelink resource based on the identifications and the resource configuration.

In some example embodiments, the resource configuration comprises a set of resource offsets, each resource offset indicating an offset from a second sidelink resource to one of the sidelink resources, the second sidelink resource used for transmitting a second RS from the first terminal device 110 to the plurality of positioning terminal devices 120.

In some example embodiments, the first terminal device 110 transmits a second message to at least one neighbor device 150 of the first terminal device 110, the second message indicating. The second message indicates a second sidelink resource for transmitting a second RS from the first terminal device 110 to the plurality of positioning terminal devices 120, and the sidelink resources for transmitting RSs from the plurality of positioning terminal devices 120 to the first terminal device 110.

In some example embodiments, the first terminal device 110 receives a negative confirmation of the first message from the second terminal device 120-1. The negative confirmation indicating at least one of a failure of decoding of the first message and incapability of transmission of the first RS via the first sidelink resource.

In some example embodiments, the first terminal device 110 obtains a first time difference. The first time difference indicates a difference between a first time point of a reception of the first RS at the first terminal device 110 and a second time point of transmission of the second RS at the first terminal device 110. The first terminal device 110 obtains a second time difference. The second time difference indicates a difference between a third time point of a transmission of the first RS at the second terminal device 120-1 and a fourth time point of reception of the second RS at the second terminal device 120-1. The first terminal device 110 determines its own position at least based on the first time difference and the second time difference.

In some example embodiments, the first terminal device 110 also obtains a further first time difference. More specifically, the first terminal device 110 determines a further first time point in response to receiving a further first reference signal from the third terminal device 120-2, determines a further second time point in response to transmiting a further second reference signal to third terminal device 120-2, and obtains a further first time difference based on the further first time point and the further second time point. In addition, the first terminal device 110 also obtains another first time deference. More specifically, the first terminal device 110 determines another first time point in response to receiving another first reference signal from the fourth terminal device 120-3, determines another second time point in response to transmiting another second reference signal to fourth terminal device 120-3, and obtains another first time difference based on the another first time point and the another second time point. Therefore, the first terminal device 110 may obtain a set of first time differences (including the first time difference, the further first time difference and the first time difference).

Further, similar with the second terminal device 120-1, the third terminal device 120-2 obtains a further second time difference and transmits the further second time difference to the first terminal device 110, and the fourth terminal device 120-3 obtains another second time difference and transmits the another second time difference to the first terminal device 110. Therefore, the first terminal device 110 may obtain a set of second time differences (including the second time difference, the further second time difference and the second time difference). The first terminal device 110 may determine its position based on the measured set of first time differences and the received set of second time differences.

In some example embodiments, the first terminal device 110 transmits the second RS to the second terminal device 120-1 via a second sidelink resource, and receives from the second terminal device 120-1 and via a third sidelink resource, the second time difference for the second RS measured by the second device.

In some example embodiments, the third sidelink resource and the first sidelink resource are at least partially overlapped.

In some example embodiments, the first message is transmitted via a physical sidelink shared channel.

In some example embodiments, the second message is transmitted via physical sidelink control channel.

Figure 6:
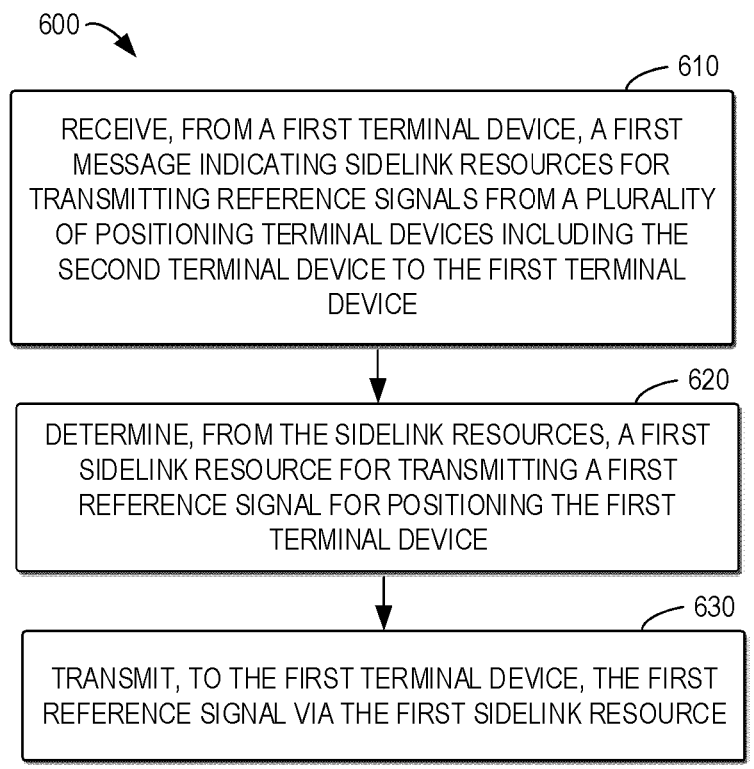
FIG. 6 illustrates a flowchart of a method implemented at a second apparatus according to some other example embodiments of the present disclosure.

FIG. 6 shows a flowchart of an example method 600 implemented at the second terminal device 120-1 in accordance with some example embodiments of the present disclosure. For the purpose of discussion, the method 600 will be described from the perspective of the second terminal device 120-1 with respect to FIGS. 1 to 3.

At block 610, the second terminal device 120-1 receives, from a first terminal device 110, a first message indicating sidelink resources for transmitting RSs from a plurality of positioning terminal devices 120 including the second terminal device 120-1 to the first terminal device 110.

At block 620, the second terminal device 120-1 determines, from the sidelink resources, a first sidelink resource for transmitting a first RS for positioning the first terminal device 110.

At block 630, the second terminal device 120-1 transmits, to the first terminal device 110, the first RS via the first sidelink resource.

In some example embodiments, the first message comprises identifications of the plurality of positioning terminal devices 120. The second terminal device 120-1 determines the first sidelink resource based on the identifications.

In some example embodiments, the first message further comprises a resource configuration at least indicating the sidelink resources. The second terminal device 120-1 determines, based on the identifications and the resource configuration, the first sidelink resource.

In some example embodiments, the resource configuration comprises a set of resource offsets, each resource offset indicating an offset from a second sidelink resource to one of the sidelink resources, the second sidelink resource used for transmitting a second RS from the first terminal device 110 to the plurality of positioning terminal devices 120.

In some example embodiments, the second terminal device 120-1 transmits a negative confirmation of the first message to the first terminal device 110 in response to at least one of the following: a failure of decoding of the first message; or incapability of transmission of the first RS via the first sidelink resource.

In some example embodiments, the second terminal device 120-1 receives, receive a further negative confirmation of the first message from a third terminal device 120-2 included in the positioning terminal devices 120, the further negative confirmation indicating at least one of the following: a failure of decoding of the first message; or incapability of transmission of a further first RS via a fourth sidelink resource from the third terminal device 120-2 to the first terminal device 110, the fourth sidelink resource is determined from the sidelink resources indicated by the first message by the third terminal device 120-2.

In some example embodiments, the second terminal device 120-1 receives from the first terminal device 110, a second RS via a second sidelink resource. The second terminal device 120-1 obtains a second time difference. The second time difference indicates a difference between a third time point of a transmission of the first RS at the second terminal device 120-1 and a fourth time point of reception of the second RS at the second terminal device 120-1. The second terminal device 120-1 transmits the second time difference to the first terminal device 110 via a third sidelink resource.

In some example embodiments, wherein the third sidelink resource and the first sidelink resource are at least partially overlapped.

In some example embodiments, the first message is transmitted via a physical sidelink shared channel.

Figure 7:
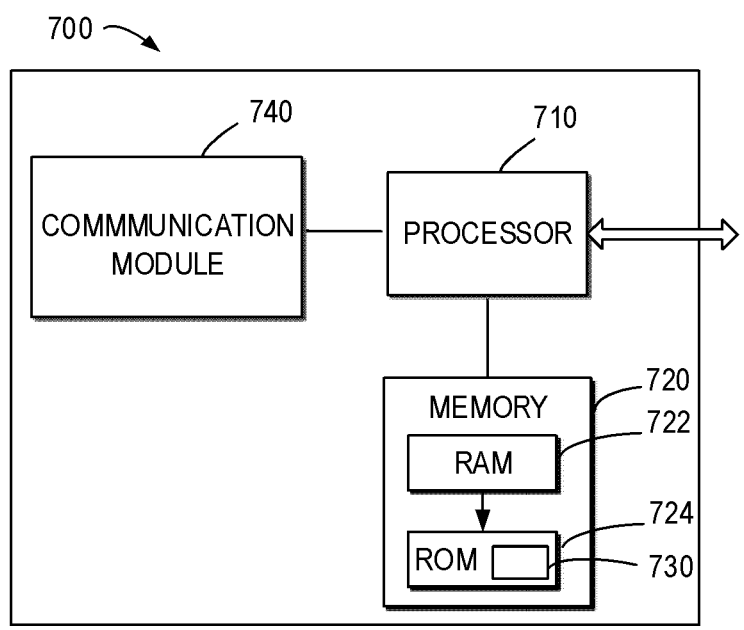
FIG. 7 illustrates a simplified block diagram of an apparatus that is suitable for implementing example embodiments of the present disclosure.

FIG. 7 is a simplified block diagram of a device 700 that is suitable for implementing example embodiments of the present disclosure. The device 700 may be provided to implement a communication device, for example, the first terminal device 110, second terminal device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the memory, e.g., ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIGS. 2, 3, 5 and 6. The example embodiments of the present disclosure may also be implemented by hardware or by a combination of software and hardware.

Figure 8:
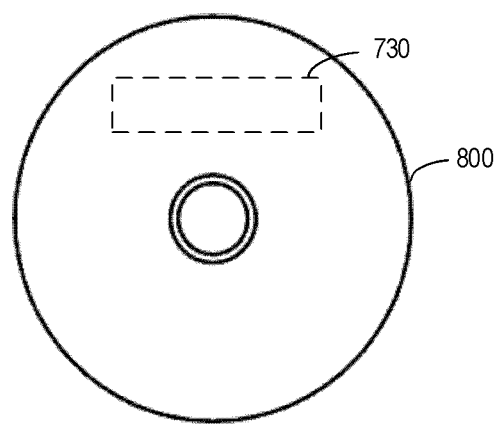
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 which may be in form of CD, DVD or other optical storage disk. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first terminal device comprising:
at least one processor; and
at least one memory including computer program code;
wherein the at least one memory and the computer program code are configured to, with the at least one processor, cause the first terminal device to:
transmit, to a plurality of positioning terminal devices including a second terminal device, a first message comprising a resource configuration and identifications of the plurality of positioning terminal devices, the resource configuration including:
a set of sidelink resources for transmitting one or more reference signals from the plurality of positioning terminal devices to the first terminal device, and
a set of resource offsets, wherein each resource offset of the set of resource offsets comprise an offset from a second sidelink resource to one of the set of sidelink resources, and wherein the first terminal device is configured to transmit a second reference signal to the plurality of positioning terminal devices based on the second sidelink resource; and
receive, from the second terminal device, a first reference signal via a first sidelink resource from the set of sidelink resources, wherein the first sidelink resource is determined by the second terminal device based on the resource configuration and the identifications.

2. The first terminal device of claim 1, wherein the at least one memory and the computer program code are configured to, with the at least one processor, to further cause the first terminal device to:
transmit a second message to at least one neighbor device of the first terminal device, the second message indicating:
the second sidelink resource for transmitting the second reference signal from the first terminal device to the plurality of positioning terminal devices, and
the set of sidelink resources for transmitting the one or more reference signals from the plurality of positioning terminal devices to the first terminal device.

3. The first terminal device of claim 1, wherein the at least one memory and the computer program code are configured to, with the at least one processor, further cause the first terminal device to:
receive a negative confirmation of the first message from the second terminal device, the negative confirmation indicating at least one of the following:
a failure of decoding of the first message, or
incapability of a transmission of the first reference signal via the first sidelink resource.

4. The first terminal device of claim 1, wherein the at least one memory and the computer program code are configured to, with the at least one processor, further cause the first terminal device to:
obtain a first time difference a first time point of the reception of the first reference signal at the first terminal device and a second time point of the transmission of the second reference signal at the first terminal device;
obtain a second time difference between a third time point of a transmission of the first reference signal at the second terminal device and a fourth time point of a reception of the second reference signal at the second terminal device; and
determine a position of the first terminal device at least based on the first time difference and the second time difference.

5. The first terminal device of claim 4,
wherein the at least one memory and the computer program code are configured to, with the at least one processor, further cause the first terminal device to:
transmit the second reference signal to the second terminal device via the second sidelink resource;
and wherein the at least one memory and the computer program code are configured to, with the at least one processor, further cause the first terminal device to obtain the second time difference by:

receive, from the second terminal device and via a third sidelink resource, the second time difference for the second reference signal measured by the second terminal device.

6. The first terminal device of claim 5, wherein the third sidelink resource and the first sidelink resource are at least partially overlapped.

7. The first terminal device of claim 1, wherein the first terminal device is configured to transmit the first message via a physical sidelink shared channel.

8. A second terminal device comprising:
at least one processor; and
at least one memory including computer program code;
wherein the at least one memory and the computer program code are configured to, with the at least one processor, cause the second terminal device to:
receive, from a first terminal device, a first message comprising a resource configuration and identifications of a plurality of positioning terminal devices including the second terminal device, the resource configuration including:
a set of sidelink resources for transmitting one or more reference signals from the plurality of positioning terminal devices to the first terminal device, and
a set of resource offsets, wherein each resource offset of the set of resource offsets comprise an offset from a second sidelink resource to one of the set of sidelink resources, and wherein the first terminal device is configured to transmit a second reference signal to the plurality of positioning terminal devices based on the second sidelink resource;
based on the resource configuration and the identifications, determine a first sidelink resource from the set of sidelink resources for transmitting a first reference signal for positioning the first terminal device; and
transmit, to the first terminal device, the first reference signal via the first sidelink resource.

9. The second terminal device of claim 8, wherein the at least one memory and the computer program code are configured to, with the at least one processor, further cause the second terminal device to:
transmit a negative confirmation of the first message to the first terminal device in response to at least one of the following:
a failure of decoding of the first message, or
incapability of a transmission of the first reference signal via the first sidelink resource.

10. The second terminal device of claim 8, wherein the at least one memory and the computer program code are configured to, with the at least one processor, further cause the second terminal device to:
receive a negative confirmation of the first message from a third terminal device included in the plurality of positioning terminal devices, the negative confirmation indicating at least one of the following:
a failure of decoding of the first message, or
incapability of a transmission of a further first reference signal via a fourth sidelink resource from the third terminal device to the first terminal device, wherein the third terminal device determines the fourth sidelink resource from the set of sidelink resources indicated by the first message.

11. The second terminal device of claim 8, wherein the at least one memory and the computer program code are configured to, with the at least one processor, further cause the second terminal device to:
receive, from the first terminal device, the second reference signal via the second sidelink resource;
obtain a second time difference between a third time point of a transmission of the first reference signal at the second terminal device and a fourth time point of reception of the second reference signal at the second terminal device; and
transmit the second time difference to the first terminal device via a third sidelink resource.

12. A method comprising:
transmitting, from a first terminal device to a plurality of positioning terminal devices including a second terminal device, a first message comprising a resource configuration and identifications of the plurality of positioning terminal devices, the resource configuration including:
a set of sidelink resources for transmitting one or more reference signals from the plurality of positioning terminal devices to the first terminal device, and
a set of resource offsets, wherein each resource offset of the set of resource offsets comprise an offset from a second sidelink resource to one of the set of sidelink resources, and wherein the first terminal device transmits a second reference signal to the plurality of positioning terminal devices based on the second sidelink resource; and
receiving, from the second terminal device, a first reference signal via a first sidelink resource from the set of sidelink resources, wherein the first sidelink resource is determined by the second terminal device based on the resource configuration and the identifications.

13. The method of claim 12, further comprising:
transmitting a second message to at least one neighbor device of the first terminal device, the second message indicating:
the second sidelink resource for transmitting the second reference signal from the first terminal device to the plurality of positioning terminal devices, and
the set of sidelink resources for transmitting the one or more reference signals from the plurality of positioning terminal devices to the first terminal device.

14. The method of claim 12, further comprising:
receiving a negative confirmation of the first message from the second terminal device, the negative confirmation indicating at least one of the following:
a failure of decoding of the first message, or
incapability of a transmission of the first reference signal via the first sidelink resource.

* * * * *